(12) United States Patent
Hirakawa

(10) Patent No.: US 9,013,741 B2
(45) Date of Patent: Apr. 21, 2015

(54) INFORMATION PROCESSING APPARATUS, CONTROL METHOD, AND STORAGE MEDIUM

(71) Applicant: Canon Kabushiki Kaisha, Tokyo (JP)

(72) Inventor: Satoshi Hirakawa, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 13/859,559

(22) Filed: Apr. 9, 2013

(65) Prior Publication Data

US 2013/0301079 A1 Nov. 14, 2013

(30) Foreign Application Priority Data

May 8, 2012 (JP) .................................. 2012-106884

(51) Int. Cl.
 *G06F 3/12* (2006.01)
 *H04N 1/32* (2006.01)
(52) U.S. Cl.
 CPC ............ *G06F 3/1276* (2013.01); *G06F 3/1204* (2013.01); *G06F 3/1224* (2013.01); *G06F 3/1285* (2013.01)
(58) Field of Classification Search
 USPC .................................. 358/448, 443, 1.15, 468
 See application file for complete search history.

(56) References Cited

U.S. PATENT DOCUMENTS

| 2003/0005100 | A1* | 1/2003 | Barnard et al. ............... 709/223 |
| 2004/0001215 | A1* | 1/2004 | Kurotsu ....................... 358/1.13 |
| 2012/0212760 | A1* | 8/2012 | Sakura ......................... 358/1.13 |
| 2013/0094045 | A1* | 4/2013 | Nakata ......................... 358/1.13 |

FOREIGN PATENT DOCUMENTS

JP          2010123103 A    6/2010

* cited by examiner

*Primary Examiner* — Jerome Grant, II
(74) *Attorney, Agent, or Firm* — Canon USA, Inc., IP Division

(57) ABSTRACT

An information processing apparatus includes a first control unit configured to display a shortcut corresponding to a program of an application and associate both of a first print queue corresponding to a first peripheral apparatus and a second print queue corresponding to a second peripheral apparatus with the application, and a second control unit configured to, if no print queue associated with the application is determined to exist after the shortcut is displayed, hide the shortcut corresponding to the program of the application, with different addresses assigned to the first peripheral apparatus and the second peripheral apparatus.

15 Claims, 12 Drawing Sheets

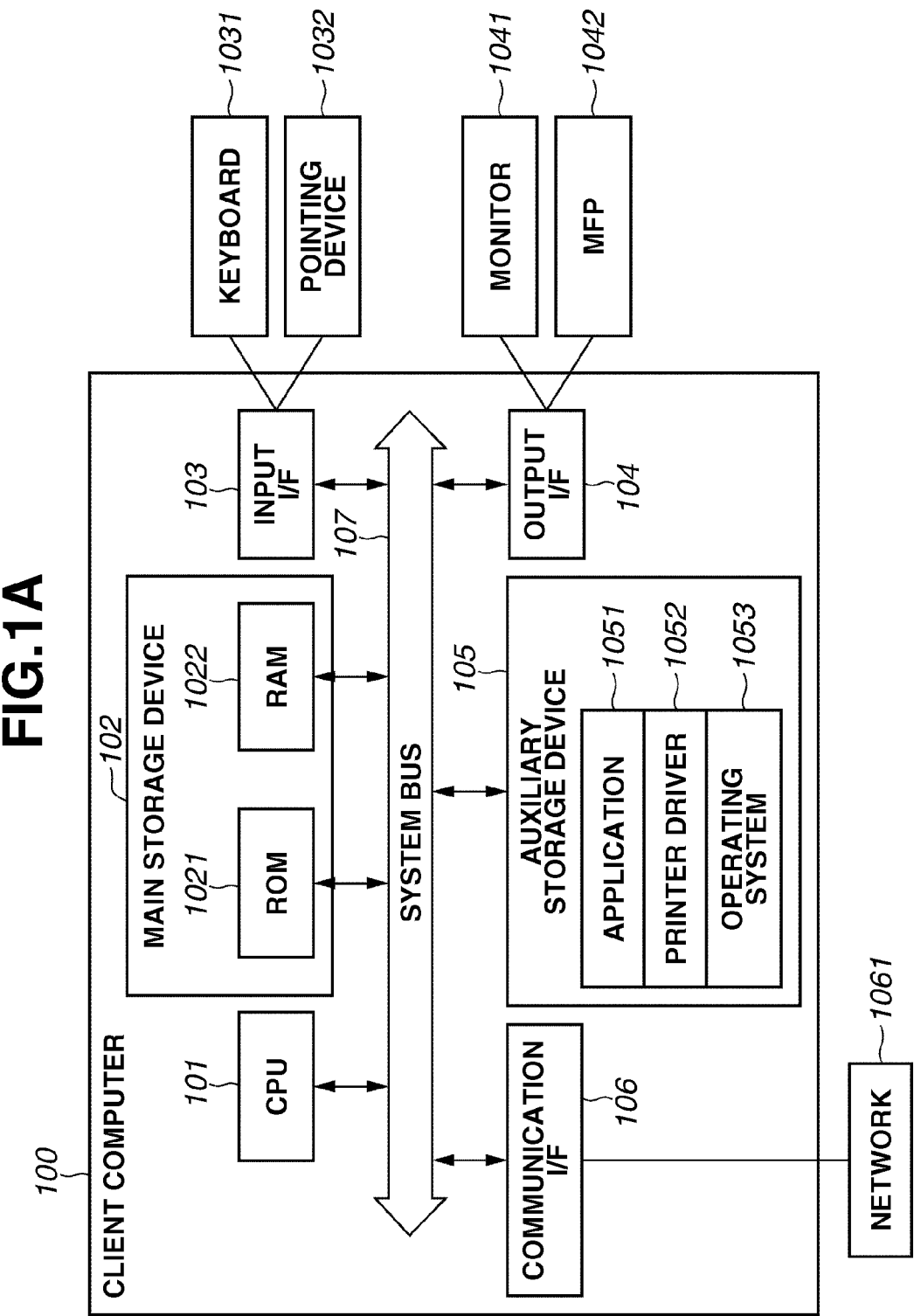

301

◢ PRINTER

MFP1    MFP2

302

IF DEVICE DRIVER ASSOCIATED WITH DEVICE MANAGEMENT APPLICATION DISAPPEARS, UNINSTALL THE DEVICE MANAGEMENT APPLICATION AFTER  999  MINUTES.

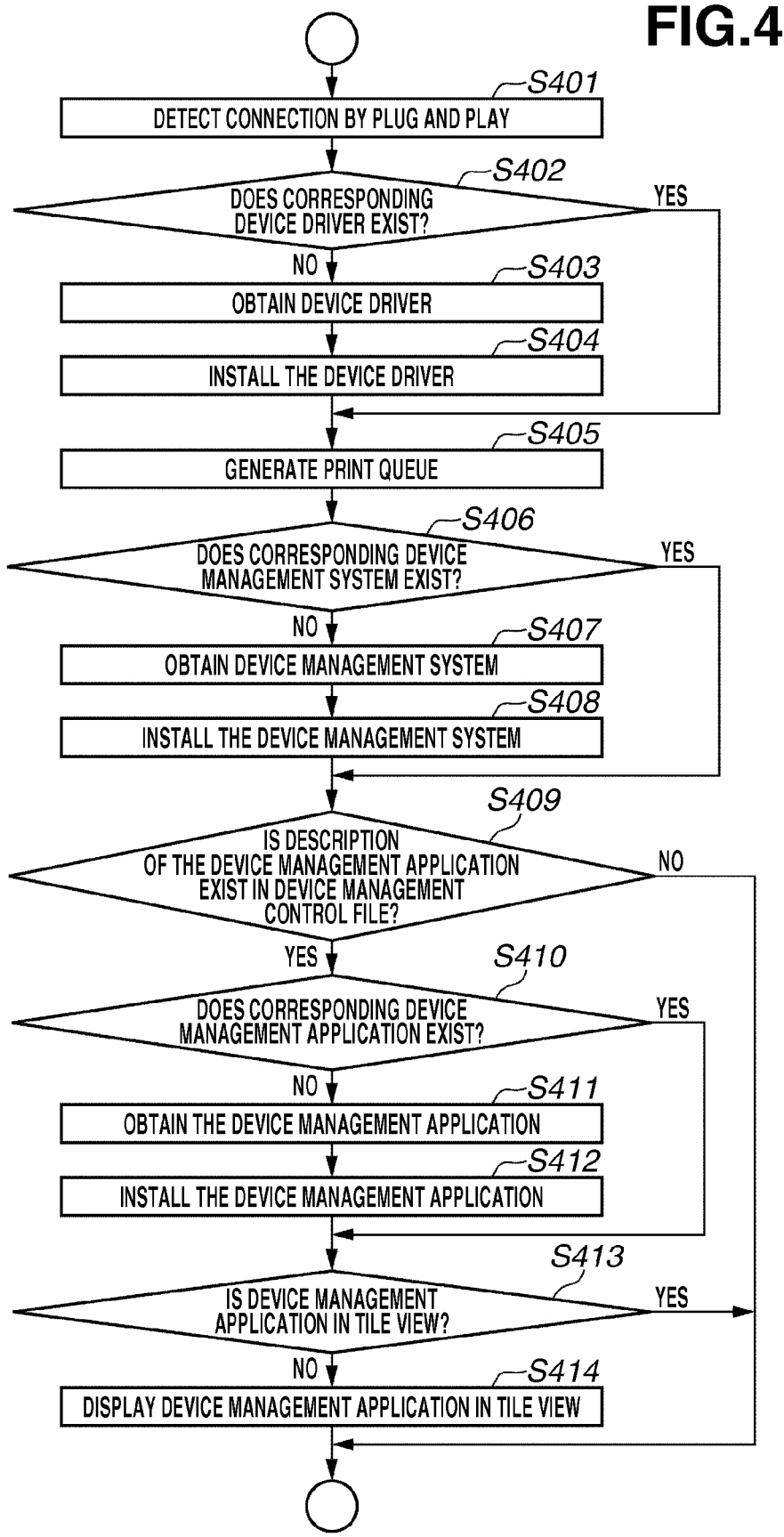

1001

INFORMATION PROCESSING APPARATUS, CONTROL METHOD, AND STORAGE MEDIUM

BACKGROUND OF THE INVENTION

1. Field of the Invention

The present invention relates to a technique regarding a shortcut of an application associated with a peripheral apparatus.

2. Description of the Related Art

Japanese Patent Application Laid-Open No. 2010-123103 discusses a method for associating a device management system with a device driver by describing a plurality of driver names in Extensible Markup Language (XML).

When a device driver (or a print queue) corresponding to a peripheral apparatus is managed in association with an application, the following problem occurs.

When all the print queues managed by the application are deleted, the print queues that correspond to the application will no longer exist.

In this case, although the application has no peripheral apparatus to manage, the shortcut for starting the application or displaying the screen of the application remains on the screen.

A system which can solve such a problem will be described.

SUMMARY OF THE INVENTION

According to an aspect of the present invention, an information processing apparatus includes a first control unit configured to display a shortcut corresponding to a program of an application and associate both of a first print queue corresponding to a first peripheral apparatus and a second print queue corresponding to a second peripheral apparatus with the application, and a second control unit configured to, if no print queue associated with the application is determined to exist after the shortcut is displayed, hide the shortcut corresponding to the program of the application, wherein different addresses are assigned to the first peripheral apparatus and the second peripheral apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 1A and 1B illustrate block configurations of hardware and software of a computer system according to an exemplary embodiment of the present invention.

FIG. 4 is a flow diagram illustrating procedural steps for installing the device management application when a print queue is generated according to an exemplary embodiment of the present invention.

DESCRIPTION OF THE EMBODIMENTS

Various exemplary embodiments, features, and aspects of the invention will be described in detail below with reference to the drawings.

FIG. 1A is a block configuration of a system including a common computer according to an exemplary embodiment of the present invention. Unless otherwise noted, as long as a function according to an exemplary embodiment of the present invention is executed, the subject matter herein can be applied not only to a single apparatus but to a system including a plurality of apparatuses, or further to a system which is connected via a network to perform processing.

A client computer 100 is configured as illustrated in FIG. 1A. The client computer 100 is described in detail below.

A central processing unit (CPU) 101 controls the entire apparatus according to a program stored in a read-only memory (ROM) 1021 or a random access memory (RAM) 1022 in a main storage unit 102. Such a program may also be stored in an auxiliary storage unit 105. The RAM 1022 is also used as a work area when the CPU 101 performs various types of processing. The auxiliary storage unit 105 stores an operating system (OS) 1053 and application software 1051. In the following description, the main storage unit 102 and the auxiliary storage unit 105 are collectively referred to as a storage unit.

An input device such as a pointing device 1032, represented by a mouse or a touch panel, or a keyboard 1031 is connected to the client computer 100 via an input interface (I/F) 103. The user gives various instructions to the computer via the input device.

An output I/F 104 is used for outputting data to an external device such as a monitor 1041 or an MFP 1042. The MFP 1042 may not be directly connected to the client computer 100 via the output I/F 104. In other words, the MFP 1042 may be connected to the client computer 100 via a network 1061 since a communication I/F 106 of the client computer is connected to the network 1061.

A system bus 107 is a common data system bus. Data is exchanged between the interfaces and the modules via the system bus 107.

Figure 1B:
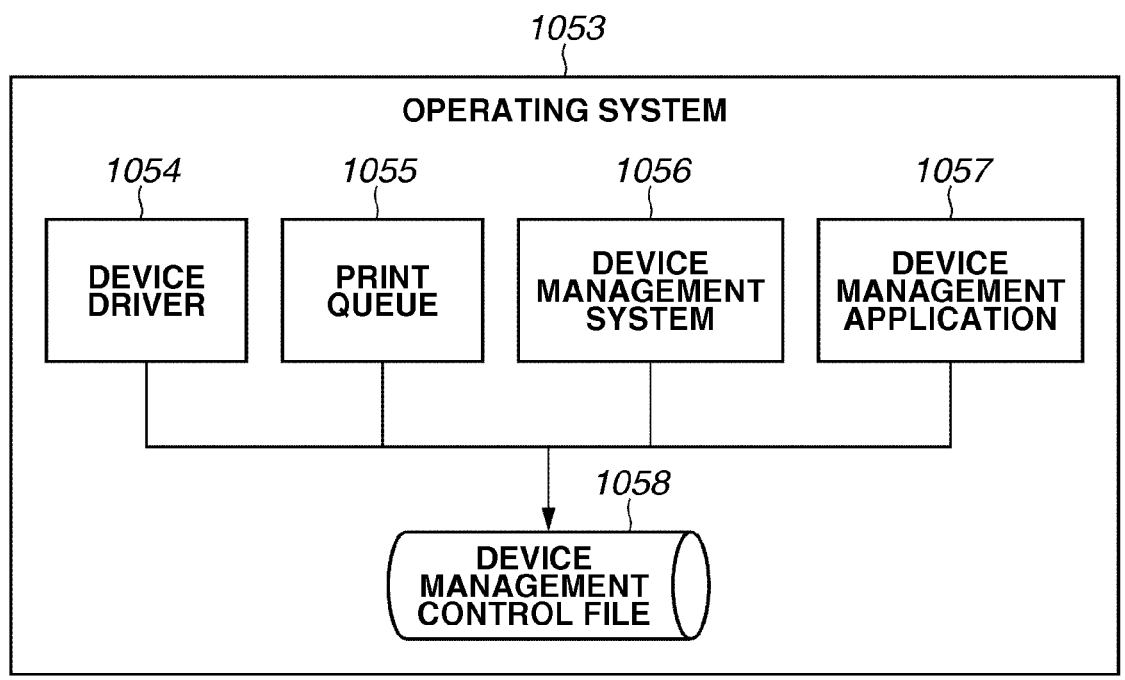

Software configuration of the client computer 100 illustrated in FIG. 1B and processing of each step in the flowcharts described below is realized by the CPU 101 executing processing based on a program stored in the storage unit.

Each of a device driver 1054 and a print queue 1055 is assigned with a device ID for each peripheral apparatus to be connected. Further, a device management control file includes information of the association with the device ID, a device management system 1056, and a device management application 1057 (for details, refer to Table 1 and FIG. 5 below).

The device management application is used for managing a peripheral apparatus connected to the client computer 100. In a first exemplary embodiment of the present invention, an MFP is used as an example of the peripheral apparatus.

As is the device management application, the device management system is also a type of software used for managing the peripheral apparatus connected to the client computer 100.

The OS 1053 references the device management control file. By referencing the device management control file, the OS 1053 can check the association with the device driver 1054, the print queue 1055, the device management system 1056, and the device management application 1057 via the device ID.

The device management control file may be generated for each model. Further, one device management control file may be generated and used for all models.

Figure 2:
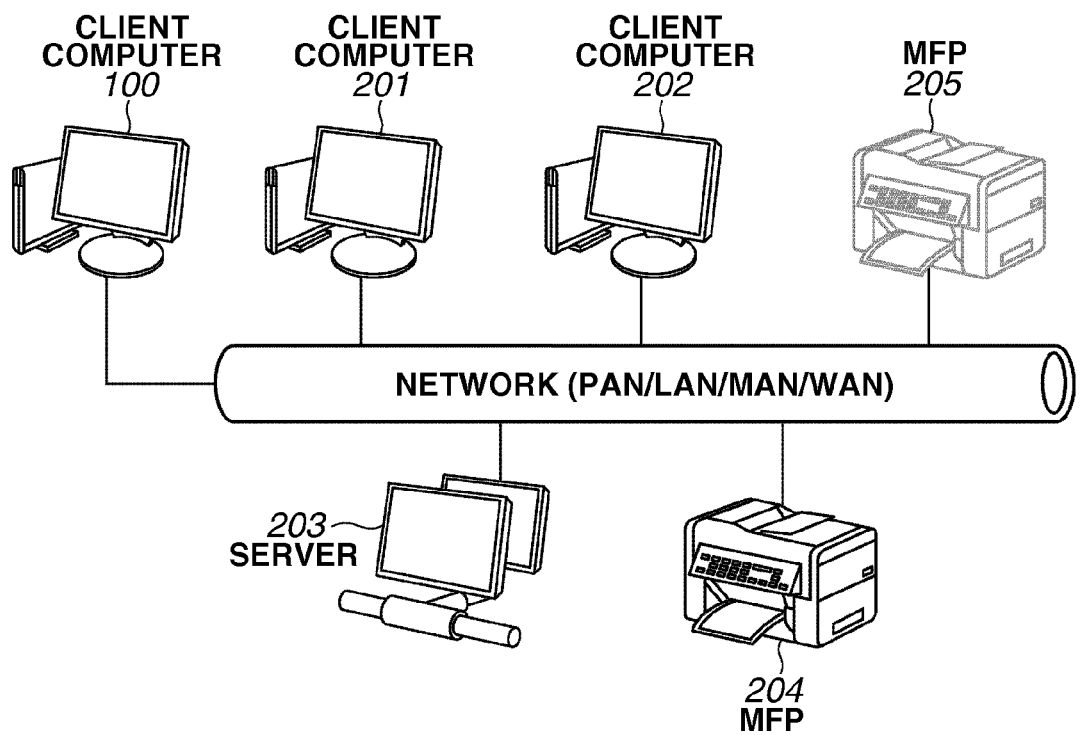
FIG. 2 illustrates a configuration of a network including a client computer, a server, and a printer according to an exemplary embodiment of the present invention.

FIG. 2 is a simplified diagram illustrating an environment of the network 1061. The client computer 100 and client computers 201 and 202 generate documents and images to be printed. One or a plurality of computers selected from the client computers 100, 201, and 202 is connected to the network. Further, a server computer 203 which manages a user of the client computer or an MFP may be connected to the network. Either (or both) of an MFP 204 and an MFP 205 is connected to the network. Although the MFP 205 is physically connected to the network, since the MFP 205 is in an offline state the MFP 205 cannot actually be used. The network includes, for example, a Personal Area Network (PAN) or a Local Area Network (LAN). Further, the network may include a small to large scale network, such as a Metropolitan Area Network (MAN) or a Wide Area Network (WAN). The apparatuses are connected to all available networks.

Figure 3A:
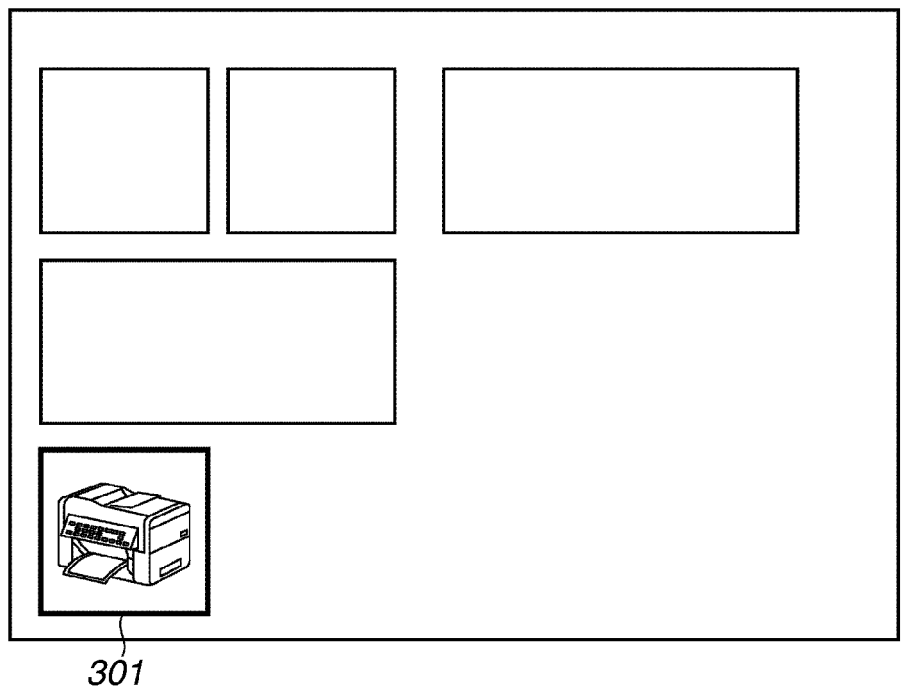
FIGS. 3A and 3B illustrate display examples of a device management application according to an exemplary embodiment of the present invention.
Figure 3B:
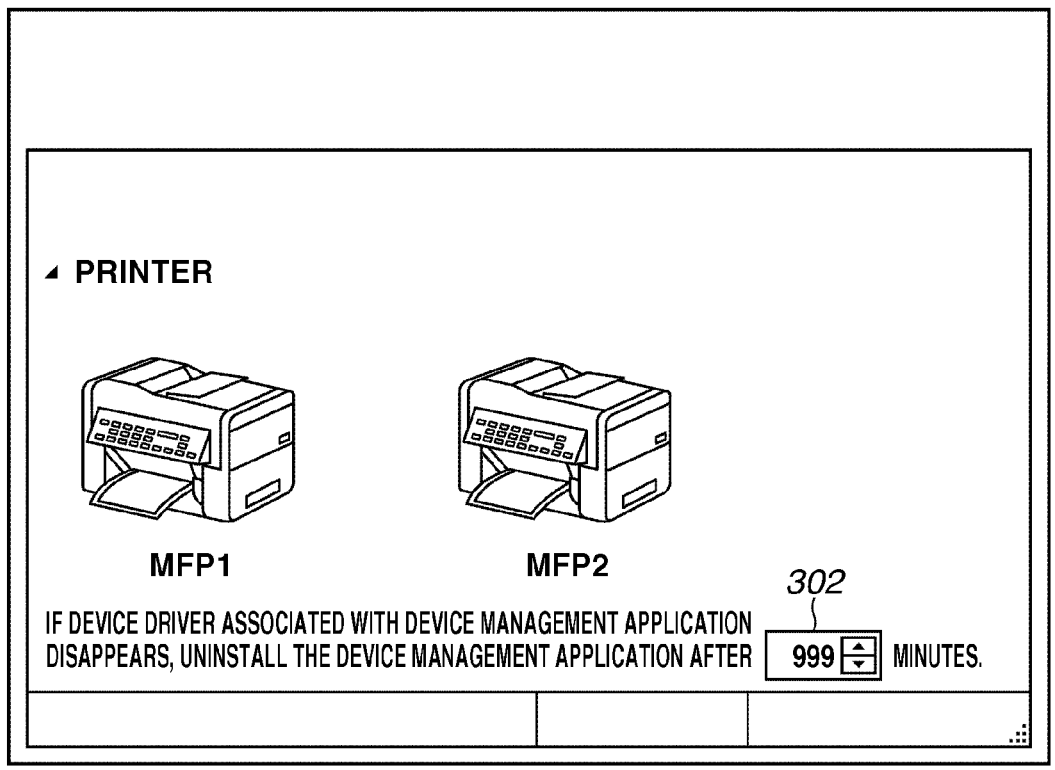

FIGS. 3A and 3B illustrate display examples of the device management application.

As illustrated in FIG. 3A, the OS 1053 displays each function in tiles. The OS 1053 displays the device management application 1057 as a tile 301 on a screen.

According to the exemplary embodiment of the present invention, the screen illustrated in FIG. 3A is referred to as a home screen and is provided by the OS 1053. Information provided by various applications which have been installed by the OS 1053 is displayed on the home screen. If the user clicks or taps the home screen, the application is started.

Further, if the user clicks the tile 301, a screen displaying the state of a plurality of peripheral apparatuses managed by (or associated with) the device management application 1057 of the tile 301 which the user has clicked will be displayed (see FIG. 3B). From this screen that displays information of a plurality of peripheral apparatuses managed by the device management application 1057, the user can check the current state of the displayed device and the consumables.

The following description focuses on the starting function of the device management application 1057 using the tile. A display area or an image which the user uses in starting the application or displaying the screen of the application is referred to as a shortcut. In the description below, although a tile is used as an example of the shortcut, an icon corresponding to the device management application 1057 may also be used instead of the tile.

FIG. 4 is a flow diagram illustrating an install procedure of the device management application 1057 when the print queue 1055 is generated.

In step S401, the OS 1053 determines that an MFP is connected to the client computer 100 via the output I/F 104. This is realized by a function of Plug and Play (PnP) in the OS 1053. Further, if the MFP is connected to the communication I/F 106 via the network 1061, the OS 1053 determines that the MFP is connected to the client computer 100. In this case, the network connection is realized by Network Plug-and-Play (N-PnP).

In step S402, the OS 1053 searches the storage unit of the client computer 100 for the device driver 1054 that corresponds to the connected MFP and determines whether such a device driver exists. If the device driver 1054 that corresponds to the connected MFP does not exist (NO in step S402), the processing proceeds to step S403. In step S403, the OS 1053 obtains the device driver 1054. The device driver 1054 is obtained from a storage medium, such as a compact disc (CD)-ROM, inserted in the client computer 100, a storage unit of the server computer which is connected to a LAN, or a cloud server via the Internet. If the device driver 1054 that corresponds to the connected MFP exists (YES in step S402), the processing proceeds to step S405.

In step S404, the OS 1053 installs the device driver 1054 obtained in step S403 on the client computer 100.

In step S405, the OS 1053 generates a print queue 1055 which corresponds to the connected MFP.

In step S406, the OS 1053 searches the storage unit of the client computer 100 to determine whether the device management system 1056 corresponding to the MFP, which is connected to the client computer 100, exists in the storage unit. If the device management system 1056 corresponding to the MFP exists (YES in step S406), the processing proceeds to step S409.

The device management system 1056 is obtained in a manner similar to that used for obtaining the device driver 1054. More precisely, the device management system 1056 is obtained from a storage medium, such as a CD-ROM, inserted in the client computer 100, a storage unit of the server computer which is connected to a LAN, or a cloud server via the Internet.

As a result of the search, if the device management system 1056 that corresponds to the MFP does not exist (NO in step S406), the processing proceeds to step S407. In step S407, the device management system 1056 that corresponds to the MFP is obtained.

When the device management system 1056 is obtained, a device management control file 1058 is simultaneously obtained from the cloud server or the like. The device management control file 1058 describes the association with the connected MFP, the device management system, and the device management application, and includes information of table 1 below.

In step S408, the OS 1053 installs the device management system 1056.

In step S409, the OS 1053 searches the device management control file 1058 to determine whether a description of the device management application associated with the MFP exists in the device management control file 1058. If the description of the device management application does not exist (NO in step S409), the processing ends.

If a description of the device management application exists (YES in step S409), the processing proceeds to step S410. In step S410, the OS 1053 searches the storage unit of the client computer 100 to determine whether the device management application 1057 corresponding to the MFP which is connected to the client computer 100 exists in the storage unit.

As a result of the search, if the device management application 1057 that corresponds to the MFP does not exist (NO in step S410), the processing proceeds to step S411. In step S411, the OS 1053 obtains the device management application 1057 that corresponds to the MFP. The device management application 1057 is obtained in a manner similar to those used for obtaining the device driver 1054 and the device management system 1056. More precisely, the device management application 1057 is obtained from a storage medium, such as a CD-ROM, inserted in the client computer 100, a storage unit of the server computer which is connected to a LAN, or a cloud server via the Internet.

In step S412, the OS 1053 installs the device management application 1057, and the processing proceeds to step S413.

In step S410, if the device management application 1057 that corresponds to the MFP exists (YES in step S410), the processing proceeds to step S413.

In step S413, the OS 1053 determines whether a program of the device management application 1057 is in a tile view on the home screen. If the program is in the tile view (YES in step S413), the processing ends. If the program is not in the tile view (NO in step S413), the processing proceeds to step S414.

In step S414, a tile that corresponds to the program of the device management application 1057 is displayed on the home screen as is the tile 301 illustrated in FIG. 3A.

Figure 5:
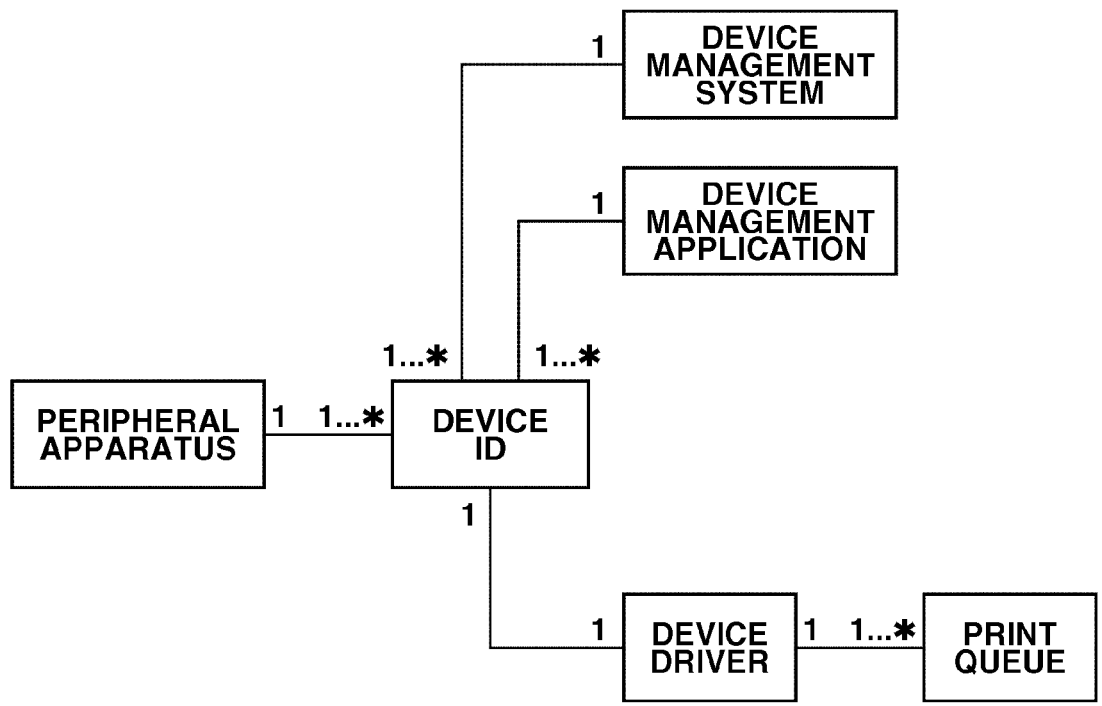
FIG. 5 is a Unified Modeling Language (UML) diagram illustrating a relation between device identification data (ID), a device management application, a device management system, a device driver, and a print queue of a multifunction peripheral (MFP).

FIG. 5 is a UML diagram illustrating a relation between a device ID of an MFP, a device management application, a device management system, a device driver, and a print queue.

The MFP is assigned a device ID. More precisely, the MFP may be assigned a plurality of device IDs. For example, the MFP may be assigned a device ID for the scanner function and a different device ID for the printer function.

The device ID is uniquely associated with the device driver.

In the relation between the print queue and the device driver, one device driver may be associated with a plurality of print queues.

Further, each of the device management system and the device management application is associated with the device ID. A plurality of device IDs may be associated with one device management system. Similarly, a plurality of device IDs may be associated with one device management application.

In other words, the device management application and the device management system are associated with the device driver and the print queue via the device ID.

Next, the association of the device ID with the device management application and the device management system will be described with reference to Table 1.

Table 1 illustrates an association with a device ID of an MFP, a device management system, and a device management application which are indicated in the device management control file 1058.

TABLE 1

| Device Name | Device ID | Device Management System | Device Management Application |
|---|---|---|---|
| MFP 1 | MFG: ABC, MDL: MFP 1, CLS: PRINTER, CMD: PDL1, DES: ABC MFP 1 | DevMg 1 | App 1 |
| MFP 2 | MFG: ABC, MDL: MFP 2, CLS: PRINTER, CMD: PDL 1, DES: ABC MFP 2 | DevMg 2 | App 1 |
| MFP 3 | MFG: ABC, MDL: MFP 3, CLS: PRINTER, CMD: PDL 2, DES: ABC MFP 3 | DevMg 3 | App 2 |

The device ID includes information of a manufacturer (MFG), a model (MDL), a class (CLS), a command (CMD), or a description (DES). For example, a "MFP 1" in Table 1 has device ID indicating the manufacturer: "ABC", model: "MFP 1", class: "PRINTER", command: "PDL 1" (a private print control command of ABC corporation), and description: "ABC MFP 1". Further, from Table 1, it is understood that the device ID of the MFP 1 is associated with a device management system "DevMg 1" and a device management application "App 1".

According to the flow diagram illustrated in FIG. 4, if the MFP 1 is connected to the client computer 100, a print queue having a name corresponding to the manufacturer and the model will be generated, and the device management system "DevMg 1" and the device management application "App 1" will be automatically installed. Further, the device management system "DevMg 1" and the device management application "App 1" manage the MFP 1. If an MFP 2 is connected to the client computer 100, since the device management application associated with the MFP 2 is the App 1, which is also the application associated with the MFP 1, when the App 1 is already installed, the App 1 will not be installed again.

The device management system manages print queues of different functions for one peripheral apparatus. If the print queues are deleted, the OS 1053 deletes the device management system. For example, if a peripheral apparatus having a printer function as well as a facsimile (FAX) function is connected to the client computer 100, print queues of the printer and the FAX functions can be managed by one device management system.

However, the device management system is unable to manage print queues corresponding to functions of a plurality of peripheral apparatuses, to which different Internet Protocol (IP) addresses are assigned. The device management system manages a single print queue corresponding to a peripheral apparatus or a plurality of print queues corresponding to a plurality of peripheral apparatuses, to which a same IP address is assigned.

As described above, in one exemplary embodiment, a queue corresponding to a FAX driver is also referred to as a print queue.

The device management application can manage a print queue corresponding to each function of a plurality of peripheral apparatuses to which different IP addresses are assigned.

Further, if the OS 1053 possesses media access control (MAC) addresses of a plurality of peripheral apparatuses, the device management system cannot manage print queues corresponding to functions of the plurality of peripheral apparatuses to which different MAC addresses are assigned. On the other hand, the device management application can manage a print queue corresponding to each function of a plurality of peripheral apparatuses to which different MAC addresses are assigned.

The IP address and the MAC address are collectively referred to as "an address".

Figure 6:
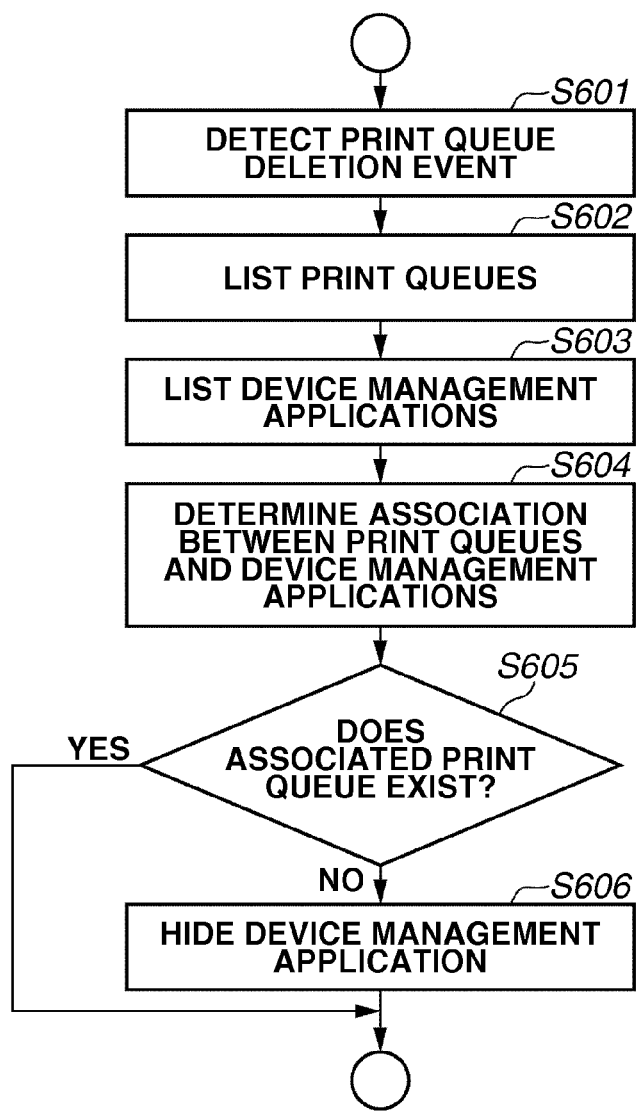
FIG. 6 is a flow diagram illustrating processing of hiding the device management application when the print queue is deleted according to an exemplary embodiment of the present invention.

FIG. 6 is a flow diagram illustrating processing of hiding a tile corresponding to a program of the device management application 1057 displayed on the home screen when a print queue is deleted.

In one exemplary embodiment, each step of all the flow diagrams, including the flow diagram in FIG. 6, is executed by the OS 1053.

A print queue can be deleted by deletion processing from the device management system or by a driver uninstaller provided by each vendor. In step S601, if the print queue 1055 is deleted by such processing, the OS 1053 detects the deletion of the print queue 1055 as a print queue deletion event.

In step S602, the OS 1053 that has detected the print queue deletion event in step S601 lists all the print queues of the client computer 100.

In step S603, the OS 1053 lists all the device management applications of the client computer 100.

In step S604, the OS 1053 determines the association between the print queues listed in step S602 and the device management applications listed in step S603. The OS 1053 determines the association by referencing the device management control file 1058.

In step S605, the OS 1053 determines whether a print queue which is associated with the device management applications listed in step S603 exists.

If the OS 1053 determines that a print queue which is associated with the device management applications does not exist (NO in step S605), the processing proceeds to step S606. In step S606, the OS 1053 hides the tile of the device management application 1057 on the home screen.

The tile of the device management application 1057 which has been hidden is not displayed on the home screen. Thus, the user is unable to recognize the device management application 1057. Further, if the tile of the device management application 1057 is not displayed, a tile of a different application can be displayed in the area in place of the device management application 1057. Thus, the user can effectively use the area on the home screen by hiding the tile.

If the device management application 1057 is started in a state where a print queue associated with the device management application 1057 does not exist, the device management application 1057 cannot display information of the peripheral apparatus. Thus, the user is unable to perform any type of operation regarding the peripheral apparatus. In order to prevent such a state, instead of hiding the above-described tile, the tile may be grayed-out to prohibit (selection of) the operation.

However, a program of the device management application 1057 as an entity is stored in the storage unit of the client computer 100. Thus, when the processing in the flow diagram in FIG. 4 is performed, the acquisition processing in step S411 may be skipped. Further, since the program as an entity can maintain the management information (a history of each printer) of the device management application 1057, if a same print queue is generated again, the OS 1053 can reuse the management information.

The program of the device management application 1057 as an entity may be deleted in step S606. If the program is deleted, in a case where the same program of the device management application 1057 becomes necessary, the program is obtained by the processing described in step S411 in FIG. 4.

Figure 7:
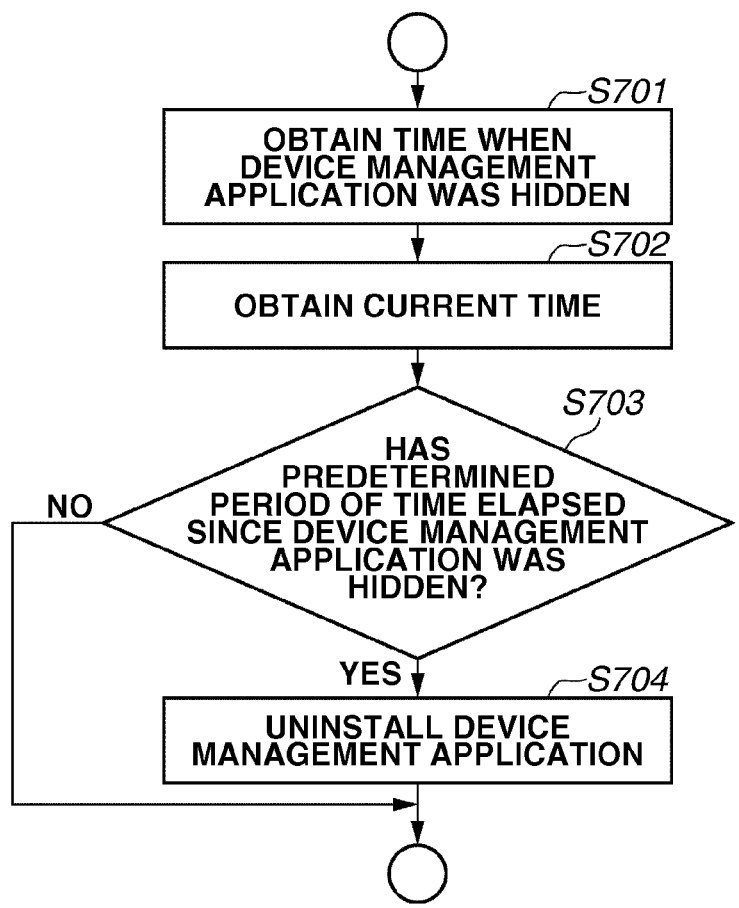
FIG. 7 is a flow diagram illustrating deletion processing of the device management application after the display of the device management application is hidden according to an exemplary embodiment of the present invention.

FIG. 7 is a flow diagram illustrating processing of deleting the device management application in a case where a predetermined period of time has elapsed from the time the device management application 1057 was hidden. The user can arbitrarily set the period of time. The user can set the predetermined period of time using, for example, the UI control of a numeric spinner 302 in FIG. 3B.

The processing of deleting the device management application 1057 in FIG. 7 is executed when the OS 1053 is started or at a predetermined date and time as a service or a task which stays resident in the OS 1053.

In step S701, the OS 1053 obtains information of the time the display of the device management application 1057 was hidden. The time information is stored in the storage unit of the client computer 100 when the hiding processing of the device management application 1057 in step S606 is performed.

In step S702, the OS 1053 obtains the current time.

In step S703, the OS 1053 compares the time the display of the application has been hidden with the current time and determines whether a predetermined period of time set by the numeric spinner 302 in FIG. 3B has elapsed. If the OS 1053 determines that the predetermined period of time has not yet elapsed (NO in step S703), the processing ends. If the OS 1053 determines that the predetermined period of time has elapsed (YES in step S703), the processing proceeds to step S704. In step S704, the OS 1053 uninstalls the device management application 1057 and deletes the program as an entity from the storage unit of the client computer 100.

Figure 8:
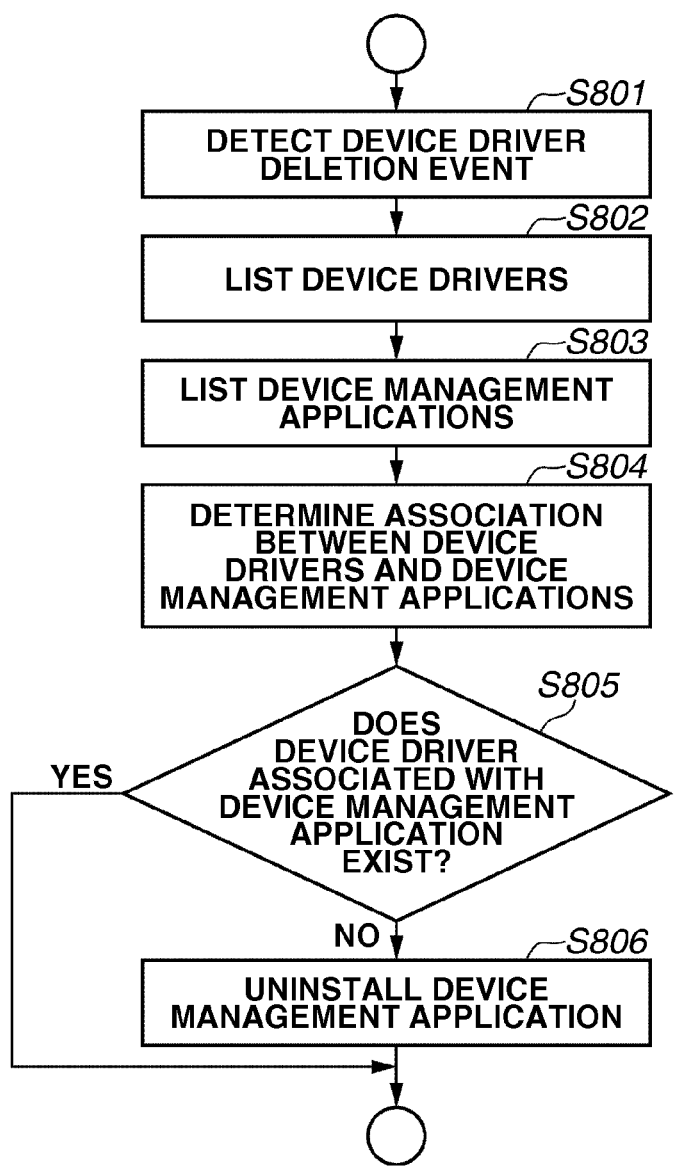
FIG. 8 is a flow diagram illustrating deletion processing of the device management application when the device driver is deleted according to an exemplary embodiment of the present invention.

Processing which is performed in a case where the print queue 1055 has been deleted is described with reference to FIG. 6. FIG. 8 is a flow diagram illustrating the processing performed by the OS 1053 in deleting the device management application 1057 in a case where the device driver 1054 has been deleted.

In some embodiments, the user may select whether to delete the print queue 1055 or the device driver 1054.

The device driver can be deleted by the deletion processing on the device management system or by a driver uninstaller provided by each vendor.

In step S801, if the device driver 1054 is deleted in the processing described above, the OS 1053 detects the deletion of the device driver 1054 as a device driver deletion event.

In step S802, the OS 1053 that detected the device driver deletion event in step S801 lists all the device drivers of the client computer 100.

In step S803, the OS 1053 lists all the device management applications of the client computer 100.

In step S804, the OS 1053 determines the association between the device drivers listed in step S802 and the device management applications listed in step S803. The OS 1053 determines the association by referencing the device management control file 1058.

In step S805, the OS 1053 performs a search on all the device management applications to determine whether a device driver associated with the device management application exists.

If the OS 1053 determines that the associated device driver does not exist (NO in step S805), the processing proceeds to step S806. In step S806, the OS 1053 uninstalls the device management application 1057, for which it has been determined that an associated device driver does not exist, and deletes the program as an entity from the storage unit of the client computer 100.

If the OS 1053 determines that the associated device driver exists (YES in step S805), then the processing ends.

According to the flow diagram illustrated in FIG. 7 or 8, since the program as an entity is deleted from the storage unit, consumption of the storage space of the storage unit can be avoided.

Next, the deletion processing of the device management application 1057 will be described.

Figure 9:
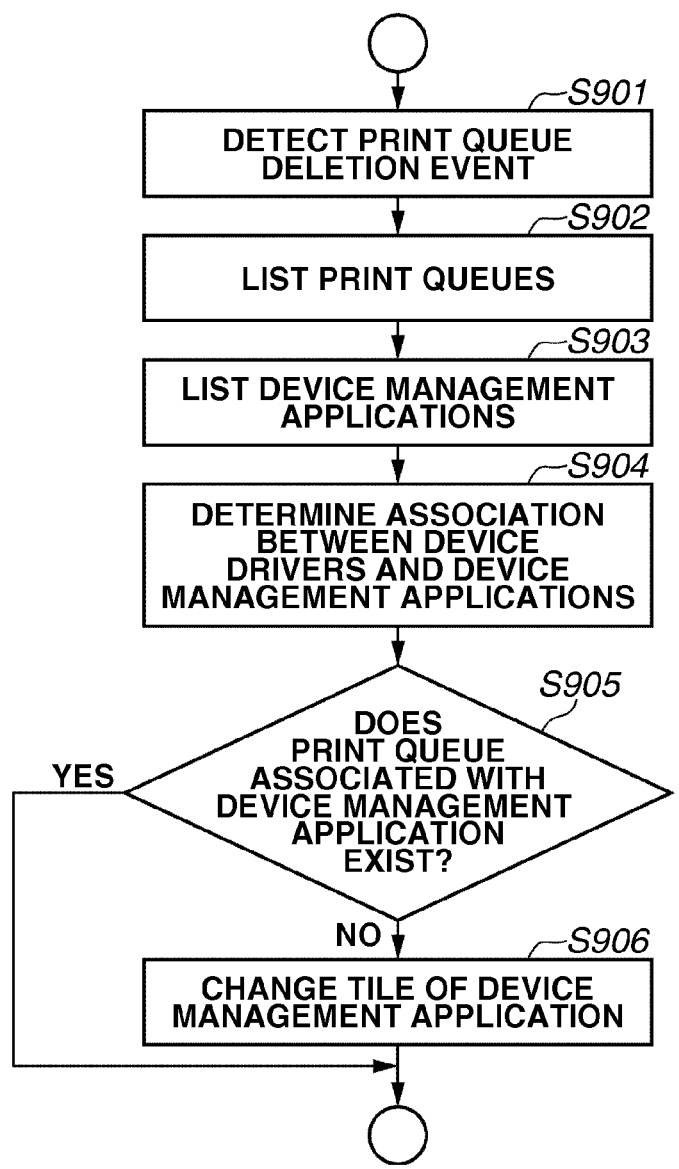
FIG. 9 is a flow diagram illustrating processing for changing a tile image of the device management application when the print queue is deleted according to an exemplary embodiment of the present invention.

FIG. 9 is a flow diagram illustrating processing for changing an image of the tile of the device management application 1057 in a case where the print queue 1055 is deleted.

In step S901, if the print queue 1055 is deleted, the OS 1053 detects the deletion of the print queue 1055 as a print queue deletion event.

In step S902, the OS 1053 lists all the print queues of the client computer 100.

In step S903, the OS 1053 lists all the device management applications of the client computer 100.

In step S904, the OS 1053 determines the association between the print queues listed in step S902 and the device management applications listed in step S903. The OS 1053 determines the association by referencing the device management control file 1058.

In step S905, the OS 1053 performs search to determine whether a print queue which is associated with the device management applications listed in step S903 exists.

Figure 10:
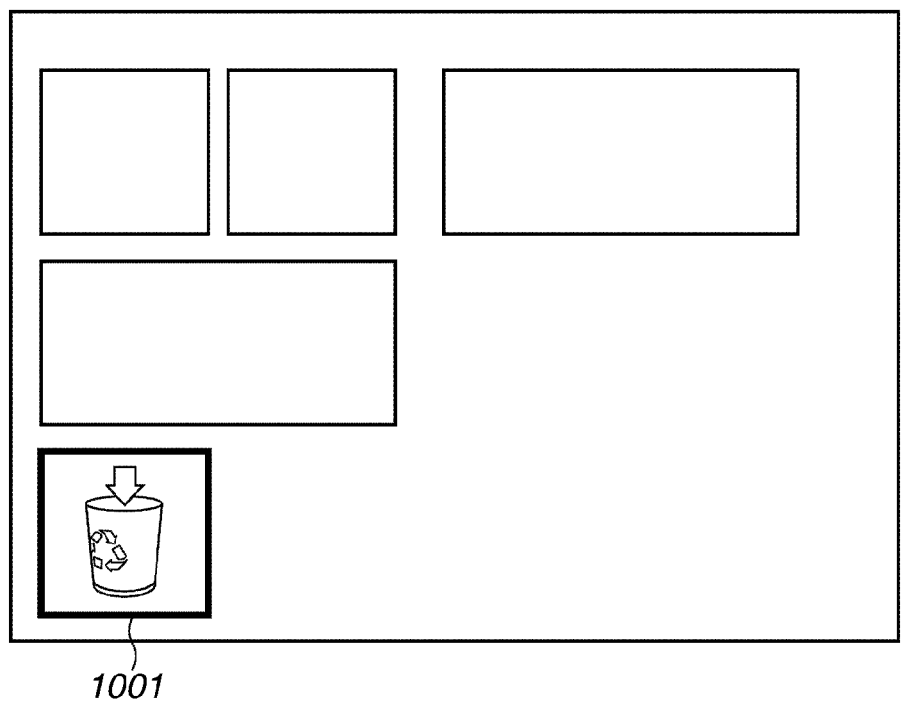
FIG. 10 illustrates a display example of the device management application according to an exemplary embodiment of the present invention.

If the OS 1053 determines that the associated print queue does not exist (NO in step S905), the processing proceeds to step S906. In step S906, the OS 1053 changes the tile image of the device management application 1057 on the screen. The tile image is changed from the tile 301, which is an image of an MFP in FIG. 3A, to a tile 1001 in FIG. 10. The tile 1001 is an image indicating "uninstall".

If the OS 1053 determines that the associated print queue exists (YES in step S905), the processing ends.

Figure 11:
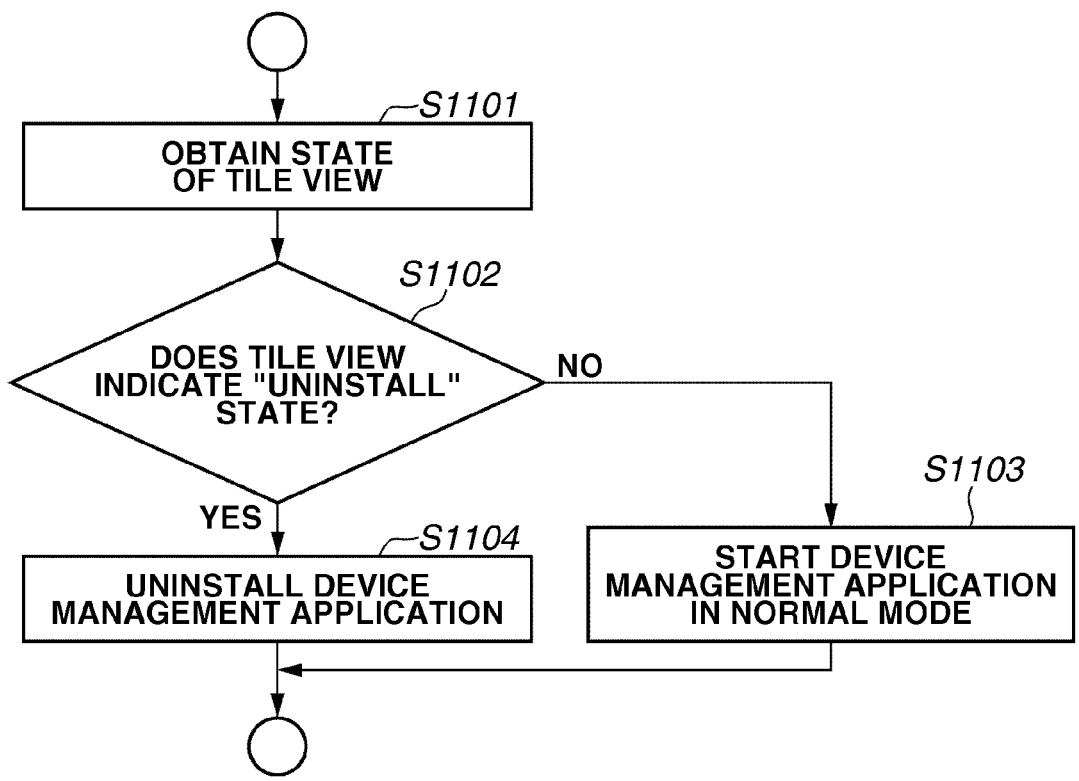
FIG. 11 is a flow diagram illustrating initialization processing, which is performed when the device management application is started in a case where a tile display indicates an uninstall image according to an exemplary embodiment of the present invention.

FIG. 11 is a flow diagram illustrating processing for differentiating processing according to whether the tile display of the device management application 1057 displays an image indicating "uninstall". The processing in FIG. 11 is executed as processing performed at initialization when the device management application 1057 is started according to an instruction by the user to start the device management application 1057.

In step S1101, the OS 1053 obtains the state of the tile view of the device management application 1057.

In step S1102, the OS 1053 determines whether the obtained state of the tile view is an image indicating "uninstall".

If the OS 1053 determines that the state of the tile view is not an image indicating "uninstall" (NO in step S1102), the processing proceeds to step S1103. In step S1103, the OS 1053 normally starts the device management application 1057.

In step S1102, if the OS 1053 determines that the state of the tile view is an image indicating "uninstall" (YES in step S1102), the processing proceeds to step S1104. In step S1104, the OS 1053 uninstalls the device management application 1057 and deletes the program as an entity from the storage unit of the client computer 100.

According to the above-described flow diagram, if the device management application 1057 is started when the tile view indicates "uninstall", the OS 1053 can delete the device management application 1057. If the user gives an instruction to delete the device management application 1057, the OS 1053 can delete the device management application 1057.

Thus, when all the print queues associated with the application are deleted, the shortcut corresponding to the application will not be continuously displayed. This results in an improvement in convenience to the user.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-106884 filed May 8, 2012, which is hereby incorporated by reference herein in its entirety.

What is claimed is:

1. An information processing apparatus comprising:
    a first control unit configured to display a shortcut corresponding to a program of an application and associate both of a first print queue corresponding to a first peripheral apparatus and a second print queue corresponding to a second peripheral apparatus with the application; and
    a second control unit configured to, if no print queue associated with the application is determined to exist after the shortcut is displayed, hide the shortcut corresponding to the program of the application,
    wherein different addresses are assigned to the first peripheral apparatus and the second peripheral apparatus,
    wherein, after installing the program of the application in a storage unit, the first control unit displays the shortcut that corresponds to the program of the application, and
    wherein, if no print queue associated with the application is determined to exist after the shortcut is displayed, the second control unit hides the shortcut corresponding to the program of the application and keeps the program of the application in the storage unit, and, if connection of the first peripheral apparatus is detected, the second control unit associates the first print queue with the application and displays the shortcut corresponding to the program of the application retained in the storage unit.

2. The information processing apparatus according to claim 1, wherein the second control unit executes a device management system as software different from the application, and
    wherein the device management system manages one of a single print queue corresponding to a peripheral apparatus and a plurality of print queues corresponding to a plurality of peripheral apparatuses, to which a same IP address is assigned.

3. The information processing apparatus according to claim 1, wherein if a predetermined period of time is determined to elapse since the shortcut corresponding to the program of the application is hidden, the second control unit deletes the program of the application.

4. The information processing apparatus according to claim 1, wherein, if both of a first device driver corresponding to the first print queue associated with the application and a second device driver corresponding to the second print queue associated with the application are deleted and, if no device driver associated with the application exists, the second control unit deletes the application.

5. The information processing apparatus according to claim 1, wherein, if the print queue associated with the application does not exist, the second control unit changes an image of the shortcut corresponding to the program of the application from a first image to a second image different from the first image, and, if an operation on the shortcut corresponding to the program of the application by a user is accepted and the image of the shortcut corresponding to the program of the application is determined to be the second image, the second control unit deletes the program of the application.

6. The information processing apparatus according to claim 1, wherein the address is selected from an IP address and a MAC address.

7. The information processing apparatus according to claim 1, wherein, after the display of the shortcut, if both of the first print queue associated with the application and the second print queue associated with the application are deleted, and the print queue associated with the application is determined not to exist, the second control unit hides the shortcut corresponding to the program of the application.

8. A control method comprising:
   executing first control for displaying a shortcut corresponding to a program of an application and associating both of a first print queue corresponding to a first peripheral apparatus and a second print queue corresponding to a second peripheral apparatus with the application; and
   executing second control for, if no print queue associated with the application is determined to exist after the shortcut is displayed, hiding the shortcut corresponding to the program of the application,
   wherein different addresses are assigned to the first peripheral apparatus and the second peripheral apparatus,
   wherein, after installing the program of the application in a storage unit, the first control displays the shortcut that corresponds to the program of the application, and
   wherein, if no print queue associated with the application is determined to exist after the shortcut is displayed, the second control hides the shortcut corresponding to the program of the application and retains the program of the application in the storage unit, and, if connection of the first peripheral apparatus is detected, the second control associates the first print queue with the application and displays the shortcut corresponding to the program of the application retained in the storage unit.

9. The control method according to claim 8, wherein the second control executes a device management system as software different from the application, and
   wherein the device management system manages one of a single print queue corresponding to a peripheral apparatus and a plurality of print queues corresponding to a plurality of peripheral apparatuses, to which a same IP address is assigned.

10. The control method according to claim 8, wherein if a predetermined period of time is determined to elapse since the shortcut corresponding to the program of the application is hidden, the second control deletes the program of the application.

11. The control method according to claim 8, wherein, if both of a first device driver corresponding to the first print queue associated with the application and a second device driver corresponding to the second print queue associated with the application are deleted and, if no device driver associated with the application exists, the second control deletes the application.

12. The control method according to claim 8, wherein, if the print queue associated with the application does not exist, the second control changes an image of the shortcut corresponding to the program of the application from a first image to a second image different from the first image, and, if an operation on the shortcut corresponding to the program of the application by a user is accepted and the image of the shortcut corresponding to the program of the application is determined to be the second image, the second control deletes the program of the application.

13. The control method according to claim 8, wherein the address is selected from an IP address and a MAC address.

14. The control method according to claim 8, wherein, after the display of the shortcut, if both of the first print queue associated with the application and the second print queue associated with the application are deleted and the print queue associated with the application is determined not to exist, the second control hides the shortcut corresponding to the program of the application.

15. A computer-readable storage medium storing a program that causes a computer to perform a method comprising:
   executing first control for displaying a shortcut corresponding to a program of an application and associating both of a first print queue corresponding to a first peripheral apparatus and a second print queue corresponding to a second peripheral apparatus with the application; and
   executing second control for, if no print queue associated with the application is determined to exist after the shortcut is displayed, hiding the shortcut corresponding to the program of the application,
   wherein different addresses are assigned to the first peripheral apparatus and the second peripheral apparatus,
   wherein, after installing the program of the application in a storage unit, the first control displays the shortcut that corresponds to the program of the application, and
   wherein, if no print queue associated with the application is determined to exist after the shortcut is displayed, the second control hides the shortcut corresponding to the program of the application and retains the program of the application in the storage unit, and, if connection of the first peripheral apparatus is detected, the second control associates the first print queue with the application and displays the shortcut corresponding to the program of the application retained in the storage unit.

* * * * *